United States Patent [19]

Gall

[11] Patent Number: 4,874,349
[45] Date of Patent: Oct. 17, 1989

[54] SEAL AND DUST GUARD ASSEMBLY FOR A UNIVERSAL JOINT TRUNNION

[75] Inventor: Ray A. Gall, Toledo, Ohio
[73] Assignee: Dana Corporation, Toledo, Ohio
[21] Appl. No.: 129,802
[22] Filed: Dec. 7, 1987
[51] Int. Cl.[4] .................... F16C 33/76; F16D 3/41
[52] U.S. Cl. .................................. 464/14; 384/486; 464/131
[58] Field of Search .............. 384/484, 486; 464/14, 464/128, 130, 131, 132, 136; 277/95, 152, 237 A, DIG. 4

[56] References Cited

U.S. PATENT DOCUMENTS

| | | | |
|---|---|---|---|
| 2,802,351 | 8/1957 | Anderson | 464/14 |
| 2,896,433 | 7/1959 | Hempel | 464/131 |
| 2,996,901 | 8/1961 | Kleinschmidt | 464/131 |
| 3,592,022 | 7/1971 | Stokely | 464/131 |
| 3,717,394 | 2/1973 | Pitner | 464/131 X |
| 3,846,995 | 11/1974 | Mangiavacchi | 464/131 |
| 4,000,628 | 1/1977 | Funatani et al. | 464/130 |
| 4,116,019 | 9/1978 | Welschof | 464/14 X |
| 4,154,065 | 5/1979 | Diffenderfer | 464/131 |
| 4,317,340 | 3/1982 | Krude et al. | 464/131 X |
| 4,515,574 | 5/1985 | Mazziotti | 464/131 |
| 4,710,150 | 12/1987 | Mangiavacchi | 464/131 X |

FOREIGN PATENT DOCUMENTS

| | | | |
|---|---|---|---|
| 86165976 | 9/1986 | Fed. Rep. of Germany . | |
| 2568330 | 1/1986 | France . | |
| 180794 | 9/1962 | Sweden | 464/128 |
| 848715 | 9/1960 | United Kingdom | 464/130 |

*Primary Examiner*—Daniel P. Stodola
*Attorney, Agent, or Firm*—MacMillan, Sobanski & Todd

[57] ABSTRACT

A seal and dust guard assembly for use with a bearing cup mounted on a trunnion of a universal joint cross member is disclosed. The trunnion includes a cylindrical friction surface, an inwardly tapered surface, a cylindrical sealing surface, and a cylindrical bearing surface. A bearing cup is rotatably mounted on the bearing surface of the trunnion. The outer surface of the bearing cup has an annular groove formed circumferentially thereabout. Between the open end of the bearing cup and the groove, the outer surface of the bearing cup is reduced in diameter. An annular seal assembly is provided for sealing the bearing cup on the trunnion. The seal assembly includes an elastomeric seal having a first lip adapted to engage the sealing surface and a second lip adapted to engage the tapered surface. The seal assembly further includes a plastic dust guard having an axially extending portion which extends over the reduced diameter portion of the bearing cup. The axially extending portion includes a flange which extends radially inwardly into the groove formed in the bearing cup so as to releasably secure the dust guards thereto. The dust guard also includes a radially inwardly extending portion which terminates in an inner friction surface. The dust guard friction surface frictionally engages the trunnion friction surface so as to releasably secure the bearing cup to the trunnion.

4 Claims, 1 Drawing Sheet

SEAL AND DUST GUARD ASSEMBLY FOR A UNIVERSAL JOINT TRUNNION

BACKGROUND OF THE INVENTION

The present invention relates in general to universal joints and in particular to an improved seal and dust guard assembly for use with a bearing cup mounted on a trunnion of a universal joint cross member.

Universal joints are structures which are well known in the art. Such joints usually include a cross member having a central body portion with four trunnions extending outwardly therefrom. The trunnions extend at right angles relative to one another and lie in a single plane. A hollow cylindrical bearing cup, closed at one end, is disposed over the end of each of the trunnions. Roller bearings are provided between each of the bearing cups and its associated trunnion such that the bearing cups are rotatably mounted thereon. Lubricant can be injected into the cross member through a fitting secured in an aperture formed through the body portion. The aperture communicates with respective passageways formed through each of the trunnions. Such injection, commonly referred to as purging, forces the lubricant outwardly from the body portion through the trunnions toward the closed ends of the bearing cups. The lubricant passes around the outer ends of the trunnions adjacent the closed ends of the bearing cups and radially inwardly back between the bearing cups and the trunnions where the roller bearings are disposed. In this manner, the roller bearings are lubricated for use.

It is known to attach a metallic dust guard to each of the trunnions in order to prevent the entry of dirt or other contaminants into the regions of the cross member where the roller bearings are located. Additionally, it is known to provide the open ends of the bearing cups with elastomeric seals. Such seals also prevent the entry of contaminants into the cross members, and further restrict the flow of lubricant out of the region of the cross member where the roller bearings are located. In prior art cross members, it has been found that these elastomeric seals did not consistently provide a uniform sealing pressure against their associated trunnions. This non-uniform sealing pressure occurred because the dust guards were vulnerable to being nicked or dented during the assembly of the cross member into the end yokes of the universal joint. Such deformation of the dust guard occasionally caused it to contact the seal, resulting in a variance in the degree of sealing pressure applied by the elastomeric seal against the trunnion near such point of contact. In this situation, non-uniform lubricant injection resulted throughout the cross member during the purging process, since most of the lubricant flowed through those seals which applied less pressure against the trunnions, while little lubricant flowed through those seals which applied greater pressure. Obviously, this undesirable situation could result in one or more of the trunnions being inadequately lubricated.

SUMMARY OF THE INVENTION

The present invention relates to an improved seal and dust guard assembly for use with a bearing cup mounted on a trunnion of a universal joint cross member. The cross member includes a central body portion having a plurality of outwardly extending trunnions. Each of the trunnions includes a relatively short cylindrical friction surface extending outwardly from the body portion, a relatively short inwardly tapered surface extending outwardly from the friction surface, a cylindrical sealing surface extending outwardly from the tapered surface, and a relatively long cylindrical bearing surface extending outwardly from the sealing surface. A bearing cup is rotatably mounted on each of the bearing surfaces of the trunnions by a plurality of roller bearings. The outer surface of each of the bearing cups has a groove formed circumferentially thereabout. Between the open end of each bearing cup and its associated groove, the outer surface of the bearing cup is reduced in diameter.

An annular seal assembly is provided for sealing each of the bearing cups on its associated trunnion. Each of the seal assemblies includes an elastomeric seal attached to a metallic support ring. The metallic rings are pressed into the open ends of the bearing cups and are retained therein by friction. The elastomeric seals each include a pair of radially inwardly extending sealing lips. One of the sealing lips engages the sealing surface of the trunnion, while the other of the sealing lips engages the tapered surface. Respective plastic dust guards are also provided for the bearings cups. Each of the dust guards includes an axially extending portion which extends outwardly over the reduced diameter portion of its associated bearing cup. The axially extending portions include flanges which extend radially inwardly into the grooves formed in the bearing cups so as to releasably secure the dust guards thereto. Each dust guard further includes a radially inwardly extending portion which terminates in an inner friction surface. The dust guard friction surfaces are sized to frictionally engage the trunnion friction surfaces so as to releasably secure the bearing cups to the trunnions.

It is an object of the present invention to provide an improved seal and dust guard assembly for use with a bearing cup mounted on a trunnion of a universal joint cross member.

It is another object of the present invention to provide such an improved seal and dust guard assembly in which the dust guard is releasably secured to the bearing cup.

It is a further object of the present invention to provide such an improved seal and dust guard assembly in which the dust guard releasably retains the bearing cup on the trunnion.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
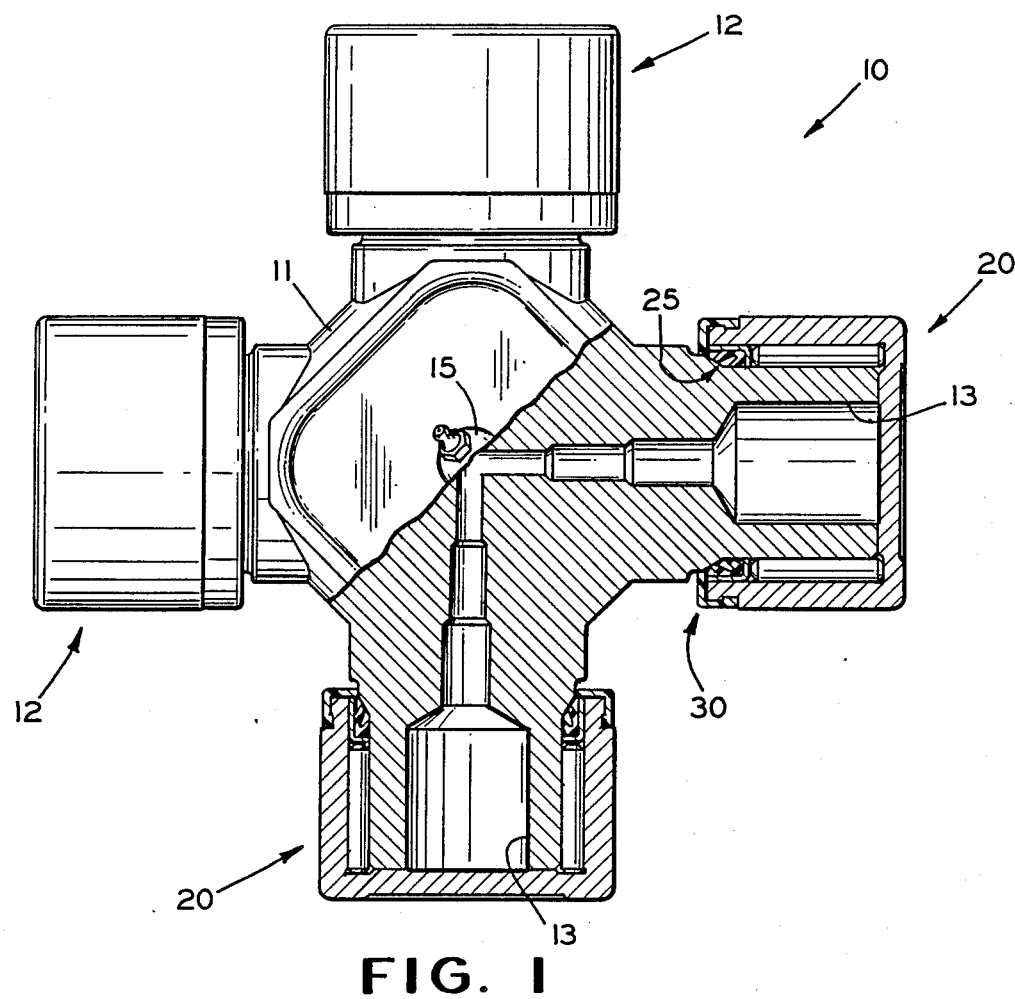
FIG. 1 is an elevational view, partially in cross section, of a cross member for a universal joint in accordance with the present invention.

Referring now to the drawings, there is illustrated a cross member, indicated generally at 10, in accordance with the present invention. The cross member 10 is adapted to form a portion of a conventional universal joint (not shown). The cross member 10 includes a central body portion 11 having a plurality of trunnions, indicated generally at 12, extending outwardly therefrom. In the illustrated embodiment, four of such trunnions 12 are formed integrally with the body portion 11. The trunnions 12 are disposed at right angles relative to one another and are oriented so as to lie in a single plane. The trunnions 12 are generally hollow and cylindrical in shape and define respective axes therethrough.

Each of the trunnions 12 includes a relatively short cylindrical friction surface 12a extending outwardly from the body portion 11, a relatively short tapered surface 12b extending outwardly from the friction surface 12a, a relatively short cylindrical sealing surface 12c extending outwardly from the tapered surface 12b, and a relatively long cylindrical outer bearing surface 12d extending outwardly from the sealing surface 12c. A second tapered surface may be provided between each of the sealing surfaces 12c and the outer bearing surfaces 12d. The outer diameters of the friction surfaces 12a are larger than the outer diameters of the sealing surfaces 12c, while the outer diameters of the sealing surfaces 12c are larger than the outer diameters of the outer bearing surfaces 12d. Each of the outer bearing surfaces 12d terminates in an open end 12e. A passageway 13 is formed through each of the trunnions 12 extending outwardly from the body portion 11. The passageways 13 all communicate with a central cavity (not shown) formed in the body portion 11. A conventional lubricant fitting 15 is disposed in a central aperture (not shown) formed through the body portion 11. The central aperture communicates with the central cavity of the body portion 11.

Figure 2:
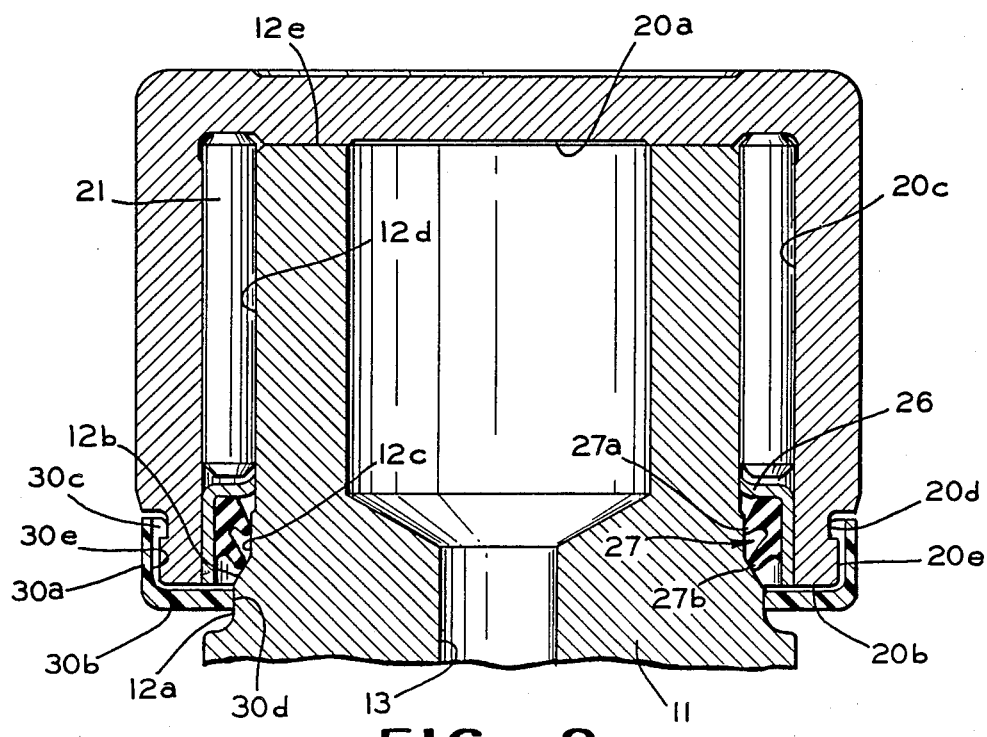
FIG. 2 is an enlarged sectional elevational view of one of the trunnions of the cross member illustrated in FIG. 1.

As best shown in FIG. 2, the friction surfaces 12a of the trunnions 12 have slightly larger outer diameters than the outer bearing surfaces 12d and are formed co-axially therewith. The tapered surfaces 12b decrease linearly in diameter as they extend axially outwardly from the frictions surfaces 12a to the outer bearing surfaces 12d. In the preferred embodiment, the tapered surfaces 12b extend at an angle of approximately thirty degrees relative to the outer bearing surfaces 12d.

A bearing cup, indicated generally at 20, is mounted about each of the outer bearing surfaces 12d of the trunnions 12. The bearing cups 20 are generally hollow and cylindrical in shape, each having a closed end 20a, an open end 20b, and a smooth inner bearing surface 20c. Each of the bearing cups 20 further includes an annular groove 20d formed about the outer circumferential surface thereof adjacent to the open end 20b. The purpose for such grooves 20d will be described in detail below. Each of the bearing cups 20 further includes a reduced outer diameter portion 20e. The reduced diameter portions 20e extend axially from the grooves 20d to the open ends 20b of the bearing cups 20. When mounted about the trunnions 12, the closed ends 20a of the bearing cups 20 abut the open ends 12e of the trunnions 12, while the inner bearing surfaces 20c of the bearing cups 20 are disposed co-axially about the outer bearing surfaces 12d of the trunnions 12.

The diameters of the inner bearing surfaces 20c of the bearing cups 20 are larger than the diameters of the outer bearing surfaces 12d of the trunnions 12. As a result, respective pluralities of conventional roller bearings 21 (only two are illustrated about each of the trunnions 12) may be disposed therebetween in a known manner. The roller bearings 21 are oriented co-axially with the axis defined by the cylindrical trunnions 12 and are arranged in a circumferential array thereabout. As is well known, the roller bearings 21 permit the bearing cups 20 to rotate about the trunnions 12.

An annular seal assembly, indicated generally at 25, is attached to the inner bearing surface 20c of each of the bearing cups 20 adjacent to the open end 20b thereof. As best shown in FIG. 2, each of the seal assemblies 25 includes a metallic support ring 26 and an elastomeric seal 27. The support rings 26 are generally L-shaped in cross section and are formed having outer diameters which are approximately equal to the inner diameters of the inner bearing surfaces 20c of the bearing cups 20. Thus, the support rings 26 can be pressed into the inner bearing surfaces 20c of the bearing cups 20 and retained therein by friction. The elastomeric seals 27 are disposed within the support rings 26 and are attached thereto by any conventional means, such as by adhesive bonding. Each of the elastomeric seals 27 includes a pair of sealing lips 27a and 27b which extend radially inwardly. The sealing lips 27a and 27b are provided to sealingly engage the trunnions 12 when the bearing cups 20 are mounted thereabout. The first sealing lips 27a engage the cylindrical sealing surfaces 12c of the trunnions 12, while the second sealing lips 27b engage the tapered surfaces 12b.

An annular dust guard, indicated generally at 30, is removably secured about the open end 20b of each of the bearing cups 20. The dust guards 30 are formed from a relatively stiff, but somewhat flexible, plastic material, such nylon manufactured under the designation Zytel ST-901 by DuPont. Each of the dust guards 30 is generally L-shaped in cross section and includes an outer axially extending portion 30a and an inner radially extending portion 30b. The axially extending portions 30a extend over the reduced diameter portions 20e of the bearing cups 20. The inner diameters of the axially extending portions 30a are slightly larger than the outer diameters of the enclosed reduced diameter portions 20e. The outer diameters of the axially extending portions 30a are equal to the outer diameters of the bearing cups 20 so as to form a flush surface therebetween. The axially extending portions 30a terminate in respective flanges 30c. The flanges 30c extend radially inwardly into the grooves 20d and define inner diameters which are smaller than the outer diameters of the reduced diameter portions 20e.

The radially extending portions 30b extend inwardly toward the trunnions 12 and terminate in flat cylindrical inner friction surfaces 30d. The diameters of the inner friction surfaces 30d of the dust guards 30 are slightly smaller than the diameters of the outer friction surfaces 12a of the trunnions 12 formed adjacent to the body portion 11. Each of the dust guards 30 further includes at least one groove 30e formed throughout the surfaces of the axially extending portions 30a and the radially extending portions 30b which face inwardly toward the bearing cups 20. In the illustrated embodiment, four of such grooves 30e are spaced equidistantly about each of the dust guards 30. The purpose of these grooves 30e will explained in detail below.

Before installing the seal assemblies 25 and the dust guards 30, the roller bearings 21 are initially assembled into the bearing cups 20 in a conventional manner. The seal assemblies 25 are next pressed into frictional engagement with the inner bearing surfaces 20c of the bearing cups 20. The dust guards 30 are then snapped onto the open ends 20b of the bearing cups 20 by pushing the axially extending portions 30a thereof over the reduced diameter portions 20e until the flanges 30c snap into the grooves 20d. When this occurs, the dust guards 30 are retained about the open ends 20b of the bearing cups 20. However, because the inner diameters of the axially extending portions 30a of the dust guards 30 are slightly larger than the outer diameters of the reduced diameter portions 20e of the bearing cups 20, the dust guards 30 fit loosely on the bearing cups 20. Since they are formed from a somewhat flexible material, the dust guards 30 may be removed from the bearing cups 20 after being installed thereon simply by prying them off.

The bearing cups 20 and dust guards 30 are next assembled onto the trunnions 12 by inserting the open ends 20b of the bearing cups 20 over the open ends 12e of the trunnions 12. The bearing cups 20 are then moved axially inwardly toward the body portion 11. Little frictional resistance is generated to such movement because the inner diameters of the dust guards 30 are larger than the outer diameters of both the outer bearing surfaces 12d and the sealing surfaces 12c of the trunnions 12. Throughout such axial movement, the sealing lips 27a and 27b may brush across the outer bearing surfaces 12d of the trunnions 12, but do not sealingly engage such outer bearing surfaces 12d. Such light engagement prevents any internal pressure from building up within the passageways 13 when the last of the four bearing cups 20 is assembled onto the cross member 11.

The axial movements of each of the bearing cups 20 are continued until the inner frictional surfaces 30d of the dust guards 30 engage the outer frictional surfaces 12a of the trunnions 12. At this point, additional force must be applied to overcome the interference fit between the dust guards 30 and the trunnions 12 and continue the inward movement of the bearing cups 20. Such additional force causes the inner frictional surfaces 30d to slide over the outer frictional surfaces 12a. The inward movements of the bearing cups 20 are continued until closed ends 20a abut the open ends 12e of the trunnion 12, as shown in the drawings. At that point, the first sealing lips 27a sealingly engage the sealing surfaces 12c, while the second sealing lips 27b sealingly engage the tapered surfaces 12b.

Because of the frictional engagement caused by the interference fit between the inner frictional surfaces 30d and the outer frictional surfaces 12a, the dust guards 30 are frictionally retained on the trunnions 12 when installed as described above. The bearing cups 20 are also retained on the trunnions 12, since the flanges 30c of the dust guards 30 extend into the grooves 20d of the bearing cups 20. By retaining the bearing cups 20 on the trunnions 12 in this manner, there is generally no need for external straps or other devices to retain the bearing cups 30 on the trunnions 12 when shipping the cross members 10 for subsequent installation. Since there is a loose fit between the dust guards 30 and the bearing cups 20, the bearing cups 20 are free to rotate relative to the dust guards 30 without interference therewith, even after installation.

Once the bearing cups 20 have been assembled onto the trunnions 12, the cross member 10 may be purged with lubricant. Although the dust guards 30 are frictionally engaged with the trunnions 12 as described above, such frictional engagement is typically not strong enough to withstand the pressures generated during the purging process. Thus, the bearing cups 20 are preferably restrained from moving axially outwardly away from the body portion 11 during such purging process. Any conventional means may be utilized to restrain the bearing cups 20 during purging of the cross member 10. As lubricant is injected through the fitting 15 into the cross member 10, it flows outwardly through the passageways 13, around the open ends 12e of the trunnions 12, and radially inwardly back about the roller bearings 21 between the bearing cups 20 and the trunnions 12.

The elastomeric seals 27 are designed such that they each exert the same amount of sealing pressure against the respective enclosed trunnion 12. This condition is maintained by the dust guards 30, which protectively enclose such seals 27 even if the dust guards 30 are damaged during assembly of the cross member 10 into a universal joint. Thus, the flow of lubricant past each of the elastomeric seals 27 during the purging process occurs evenly, and all of the trunnions 12 are equally lubricated. The grooves 30e in the dust guards 30 provide paths for the lubricant to flow out of the cross member 10. During use, the dust guards 30 continue to protectively enclose the seal assemblies 25.

In accordance with the provisions of the patent statutes, the principle and mode of operation of the present invention have been explained and illustrated in its preferred embodiment. However, it must be understood that the present invention may be practiced otherwise than as specifically explained and illustrated without departing from its spirit or scope.

What is claimed is:

1. A cross member for a universal joint comprising:
 a body portion having a least one trunnion extending outwardly from said body portion, said trunnion including an outer friction surface extending outwardly from said body portion and an outer bearing surface extending outwardly from said friction surface;
 a bearing cup having an open end an inner bearing surface, said bearing cup being disposed about said trunnion such that said inner bearing surface of said bearing cup is disposed co-axially about said outer bearing surface of said trunnion;
 bearing means disposed between said inner bearing surface of said bearing cup and said outer bearing surface of said trunnion for permitting rotation of said bearing cup relative to said trunnion;
 a seal assembly secure within said inner bearing surface of said bearing cup and adapted to sealingly engage said trunnion; and
 a dust guard connected to said bearing cup including an axially extending portion and a radially extending portion, said radially extending portion extending adjacent to said open end of said bearing cup and terminating in an inner friction surface, said inner friction surface of said dust guard being frictionally engaged with said outer friction surface of said trunnion to retain said bearing cup thereon, at least one groove being formed throughout an inner surface of said radially extending portion and said axially extending portion.

2. The invention defined in claim 1 wherein said dust guard further includes a radially inwardly extending flange formed on said axially extending portion which cooperates with a circumferential groove formed about an outer surface of said bearing cup for releasably connecting said dust guard to the bearing cup.

3. The invention defined in claim 2 wherein a plurality of such grooves are formed radially through out an inner surface of said radially extending portion and said axially extending portion.

4. The invention defined in claim 1 wherein said trunnion further includes a tapered surface disposed between said outer friction surfaced and said outer bearing surface and a sealing surface disposed between said tapered surface and said outer bearing surface, said tapered and friction surfaces adapted to be engaged by said seal assembly.

* * * * *